United States Patent Office 3,398,977
Patented Aug. 27, 1968

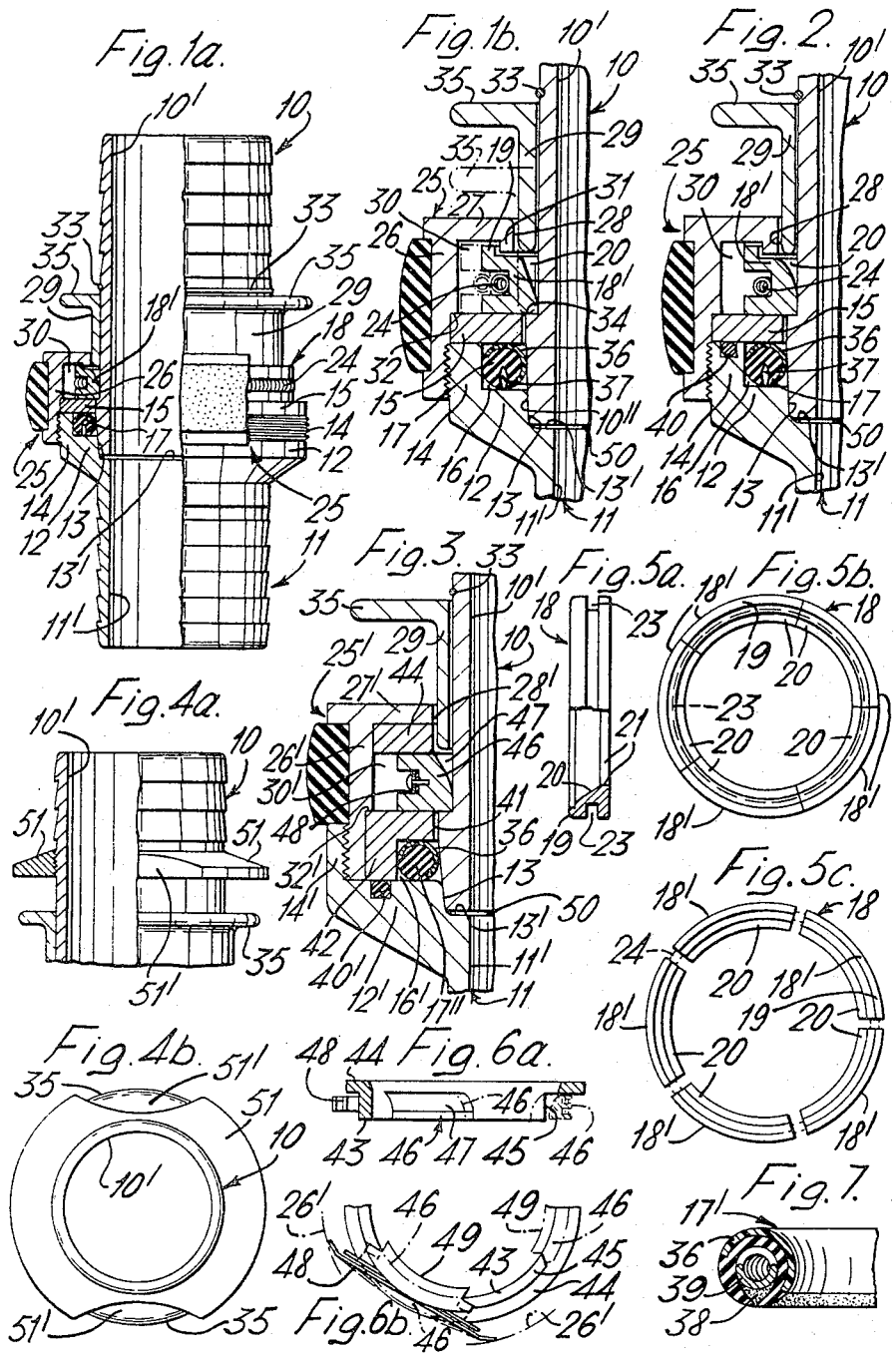

3,398,977
PIPE COUPLING
Rikizo Yoneda, 64 Shimogamo Umenoki-cho,
Sakyo-ku, Kyoto, Japan
Continuation-in-part of application Ser. No. 510,203,
Nov. 29, 1965. This application Oct. 7, 1966, Ser.
No. 585,066
Claims priority, application Japan, Feb. 13, 1965,
40/11,054
3 Claims. (Cl. 285—45)

ABSTRACT OF THE DISCLOSURE

A coupling device comprising: a female part having a through axial bore and provided adjacent the mating end thereof with a radially outwardly extending flange portion; a male part having a through axial bore and provided adjacent the mating end thereof with a circumferentially extending shoulder; a cover member removably mounted adjacent the first end thereof on said flange, said cover member having adjacent the second end thereof a radially extending wall portion having a centrally disposed opening adapted to freely receive the mating end of said male part, and said cover member cooperating with said flange portion to define a radially inwardly opening recess; a divider means removably positioned within said recess by the cover and flange portion and cooperating therewith to divide said recess into radially inwardly opening first and second cavities, respectively; an annular sealing means disposed within said first cavity; a locking means disposed within said second cavity, said divider means, said annular sealing means and said locking means being removable from said recess through said first end of said cover when removed from said flange portion, said locking means including a plurality of segments and resilient means encircling said segments whereby said segments form a radially outwardly expansible ring whose nonexpanded inner diameter is less than the outer diameter of the mating end of said male part, said ring having an inwardly disposed portion adapted to engage said coupled position and to prevent withdrawal of said male and female parts to normally maintain said parts in a coupled position and to prevent withdrawl of said male part through said wall opening, each of said ring segments and said wall portion having axially extending means disposed in overlapping relation and cooperating to prevent removal of said ring through said wall opening upon withdrawal of said male part therethrough, said first cavity being bounded in part by an axially extending inwardly facing surface, said annular sealing means being operably disposed in engagement with said axially extending inwardly facing surface of said first cavity and dimensioned to sealingly engage said second diameter portion of said male part when in coupled position; and lock release means slidably mounted on said male part for movement axially toward said shoulder, and said sleeve when moved towards said shoulder being adapted to engage said segments and expand said ring against the bias of said resilient means to release said locking connection.

This invention relates to improvements in a pipe joint or coupling of the type that comprises two telescopically interfitting parts which are releasably locked against axial separation.

This application is a continuation-in-part of copending application Ser. No. 510,203, filed Nov. 29, 1965, now abandoned.

For a pipe coupling to perform its function perfectly, it is required that the coupling should be leak-proof under various pressure conditions. There is known a pipe coupling which comprises a male part so arranged as to be fitted into a female part to be locked therein, with a sealing ring placed in a circular groove formed in the inner surface of the mating end of the female coupling part. A sealing ring having a U-shaped cross section has been in wide use, but its capacity of preventing leakage has proven very unsatisfactory. An O-ring has been proposed for use in place of the U-shape sectioned ring. Difficulty has been encountered, however, in mounting or dismounting the sealing ring, whether it be U-shape sectioned ring or O-ring, in or out of the groove. Moreover, formation of such a circular groove in the inner surface of the coupling part requires much time and accurate machining and, therefore, is not suitable for mass production.

Another requirement of the coupling is that it should be quick and easy in connection and disconnection of the mating parts. Various types of so-called quick connect and disconnect couplings have been proposed, but to the best knowledge of the inventor they are all more or less complicated in construction. It is also required of the coupling that once the male and female parts have been connected, they be securely protected against axial separation under various working conditions.

It is probable that while in use, the pipe coupling receives external forces in various directions. Suppose, for example, that a lateral force is applied to one of the axially connected coupling parts. This may well cause misalignment or bending of the axis of that one coupling part relative to that of the other coupling part. Such axial misalignment or bending may in turn break the sealing contact between the sealing ring and the coupling parts, with resulting leakage of the fluid passing therethrough.

Therefore, it is one object of the invention to provide a pipe coupling which is capable of maintaining the axial alignment of the two connected coupling parts even when a lateral force is applied to one of the coupling parts relative to the other, thereby accomplishing a perfect sealing between the two coupling parts under various working conditions.

Another object of the invention is to provide a pipe coupling of the character described in which the two coupling parts can be quickly and easily connected and disconnected without use of any tools whatsoever.

Another object of the invention is to provide a pipe coupling of the character described which can be quickly and easily locked against and released for axial separation of the couplings parts.

Still another object of the invention is to provide a pipe coupling of the character described which is provided with a sealing ring which provides a perfect sealing under both high and low pressures and which is highly resistive to abrasion and free of adhesion under various working conditions.

A further object of the invention is to provide a coupling of the character described in which the component elements or parts constituting the female coupling part can be easily and quickly assembled or disassembled.

A further object of the invention is to provide a coupling of the character described which is simple in construction and easy in machining to achieve lower manufacturing costs.

A still further object of the invention is to provide a coupling of the character described which can be used for various fluids, powders, etc.

Other objects, features and advantages will be more fully understood from the following detailed description of preferred embodiments thereof with reference to the accompanying drawings, wherein like reference numerals denote like parts and wherein;

FIG. 1a is a view, partly in longitudinal section and partly broken away, of a pipe coupling embodying the invention;

FIG. 1b is an enlarged view of a portion of FIG. 1a;

FIGS. 2 and 3 are views similar to FIG. 1b but showing different embodiments of the invention;

FIG. 4a is a portion of a modified form of the male coupling part as shown in FIGS. 1a, 1b, 2 and 3;

FIG. 4b is a top plan view of FIG. 4a;

FIG. 5a is a partly sectional elevation of a locking ring for use in the coupling of the invention;

FIG. 5b is a top plan view of the locking ring of FIG. 5a;

FIG. 5c is a view similar to FIG. 5b showing the ring in an expanded condition;

FIG. 6a is a vertical sectional elevational view of another locking means used in the pipe coupling of the invention; and FIG. 6b is a bottom view of the locking means as shown in FIG. 6a; and FIG. 7 is a section of another O-ring used in the pipe coupling of the invention.

Referring to the drawings, there is shown a pipe coupling comprising a male part 10 having a through bore 10′ and a female part 11 having a through bore 11′. The female coupling part 11 is formed at the mating end thereof with an integral, outwardly turned flange 12. The flange 12 is provided at its outer periphery with an integral, axially extending wall 14 which is externally threaded. On the top end surface of the wall 14 of the flange 12 there is simply placed a separate annular plate member 15 having an outer diameter between the outer and inner diameters of the flange wall 14 and an inner diameter greater than the outer diameter of the mating end portion of the male coupling part 10. The annular plate member 15 is separate from the other component parts, and when the plate 15 is placed on the wall 14, there is formed in the flange 12 an inner circumferential groove 16 defined by the upper surface of the flange 12, the inner lateral surface of the wall 14 and the under surface of the plate 15. The groove 16 is open radially inwardly of the coupling part 11 and receives therein a sealing O-ring 17.

Upon the annular plate 15 there is placed a locking means in the form of a ring 18. The locking ring 18 is formed at its upper end surface with an upwardly projecting rim 19 and at its inner circumferential surface with a taper formation 20 terminating in a cylindrical portion 21. An encircling groove 23 is formed in the outer lateral surface of the ring 18. As most clearly shown in FIG. 5c, the ring is split into a plurality, say, five component parts 18′ which are assembled by means of a resilient ring member, for example, a coil spring ring 24 placed in the groove 23. The inner diameter of the cylindrical portion 21 of the locking ring 18 is a little smaller than the outer diameter of the mating end portion of the male coupling part 10. The mating end portion is formed of a larger diameter than elsewhere in the male coupling part.

Characteristic of the invention is that the mating end portion of the male coupling part is tapered as at 10″ toward its end, and that the corresponding mating end of the female coupling part is provided with deep axial recess 13 terminating in an annular shoulder 13′ for receiving therein the tapered end portion of the male coupling part when the two coupling parts are connected.

The annular plate 15 and the locking ring member 18 placed thereupon are retained in place by a cylindrical cover 25 having a skirt 26 threaded to the lateral wall 14 of the flange 12 of the female coupling part. The cover 25 is also provided with an integral top end wall 27 extending radially inwardly, leaving a central opening 28 for the mating end of the male coupling part 10 with a lock release sleeve 29 carried thereon to be inserted through and defining a chamber 30 for enclosing therein the annular plate 15 and the locking ring 18. The top wall 27 is provided at its inner periphery with a depending rim 31 engaging the rim 19 of the locking ring 18 to retain this ring in place. The annular plate 15 is retained in place by a circular shoulder 32 formed on the inner lateral surface of the skirt 26 of the cover 25.

The lock release sleeve 29 is axially slidable on the male coupling part, the range of movement of the sleeve being defined at opposite ends by a circumferential stop ring 33 secured to the male coupling part and a circumferential shoulder 34 terminating the enlarged mating end of the male coupling part. The sleeve 29 may be provided with a flange 35 for easy manipulation. The flange 35 may be replaced by a pair of diametrically opposed projections or ears, not shown.

The sealing ring 17 may be formed of a suitable resilient plastic material, such as rubber, depending upon the kind of material passing through the coupling. The inner diameter of the sealing ring is a little smaller than the outer diameter of the mating end portion of the male coupling part. Preferably, those portions of the ring surface which are in sealing contact with the outer lateral surface of the enlarged mating end portion of the male coupling part and the under surface of the annular plate 15 are coated or laminated with a material 36 which is highly resistive to abrasion and free of adhesion, such as tetrafluoroethylene, commercially available under the trademark of Teflon. The sealing ring may be formed with a generally radial groove 37 for easier deformation in a manner to increase the sealing effect, especially under pressure as will be described hereinafter.

FIG. 7 shows another type of sealing ring for use in the coupling of the invention. The ring 17′ also may be formed of a suitable plastic resilient material and is provided with a generally concentrical bore 38 extending longitudinally of the ring and open at one side of the lateral surface thereof, with a resilient core ring, such as a coil spring ring 39 being fitted into the bore 38. A Teflon lamination 36 is applied to the ring 17′.

FIG. 2 shows another embodiment of the invention, wherein the arrangement is substantially the same as that shown in FIG. 1b, except that in the top end surface of the lateral wall 14 of the flange 12 of the female coupling part, there is formed a circumferential groove, in which a sealing ring 40 is fitted for providing an additional seal between the under surface of the annular ring 15 and the top end surface of the flange wall 14.

In FIG. 3, the annular plate member 15 of FIGS. 1b and 2 are replaced by a separate annular member 41 provided at its periphery with a circumferential skirt 42 and having an outer diameter smaller than the inner diameter of the flange wall 14′ of the female coupling part 11 and an inner diameter greater than the outer diameter of the enlarged mating end of the male coupling part. The member 41 is placed on the upper surface of the flange 12′ of the female coupling part 11 so that an inner circumferential groove 16′ is defined by the under surface of the radial top wall of the member 41, the inner lateral surface of the skirt 42 thereof and the upper surface of the flange 12′ of the female coupling part. A sealing O-ring 17″ is fitted in the groove 16′. In that circumferential area of the upper surface of the flange 12′ which is in contact with the lower end surface of the skirt 42 of the member 41, there may be formed a circumferential groove in which a sealing ring 40′ is fitted to provide an adidtional sealing effect.

The member 41 is held in place by a cover 25′, the cylindrical portion 26′ of which has its lower end threaded to the lateral wall 14′ of the flange 12′ internally thereof, with a shoulder 32′ formed in the inner circumferential surface of the skirt 26′ engaging the outer peripheral edge of the member 41 to hold the same in place.

The cover 25′ has its top wall 27′ provided with a central opening 28′ whose diameter is sufficient for the male coupling part 10 with the axially slidable lock release sleeve 29 to be inserted into. The cover 25′ defines a chamber 30′ which encloses a locking means. As shown in FIGS. 6a and 6b, the locking means comprises a cylindrical portion 43 and a flange portion 44, the former being provided with a plurality, say, three notches 45 each for a segmental claw 46 to be fitted therein. Each claw is provided with a tapered inner surface 47 and a pair of leaf springs 48 secured to the outer surface thereof, which urge the claw, when the locking means is placed within the chamber 30' of the cover 25', to project radially inwardly of the cylindrical portion 43, as most clearly shown in FIG. 6b. Under the condition, the circle including the inner edges 49 of the claws 46 has a smaller diameter than the outer diameter of the enlarged mating end portion of the male coupling part 10.

In any of the embodiments above described, the male coupling part may advantageously be provided with a circumferential flange or brim 51 just above the lock release sleeve 29 and extending outwardly to at least the same extent as, and preferably more than, the flange 35 of the lock release sleeve 29 as shown in FIG. 4a. The brim 51 may have two diametrically opposite portions 51' cut away, as clearly shown in FIG. 4b, for easier manipulation of the lock release sleeve.

Connection of the male and female coupling parts is accomplished by simply inserting the former into the latter without use of any kind of tool. Referring to FIGS. 1a, 1b and 2, for example, as the mating end of the male coupling part is advanced through the opening 28 of the cover 25, the outer edge of the male coupling part comes into contact with the tapered inner surface 20 of the locking ring 18 and forces it to expand radially outwardly as shown in FIG. 5c, against the force of the resilient ring 24 until the enlarged mating end portion of the male coupling part passes through the locking ring for the tapered end 10" to be received by the corresponding axial recess 13, whereupon the ring is restored by the compression of the spring 24 to its original diameter and the inner peripheral edge of the locking ring engages the shoulder 34 of the enlarged mating end portion of the male coupling part to securely connect the male to the female coupling part, with the tapered end 10" having been fitted into the recess 13 to bring the bore 10' into communication with the bore 11', and the sealing ring 17 having been slightly deformed with the groove 37 helping such deformation.

In disconnecting the two coupling parts, the lock release sleeve 29 is thrusted into the opening 28 of the cover 25 to expand the locking ring 18 radially outwardly, as shown in dot-and-dash lines in FIG. 1b, to release the locking engagement between the locking ring and the male coupling part. Then the male coupling part can be simply pulled out.

It will be easily seen that connection and disconnection of the two coupling parts in FIG. 3 is effected in a similar manner as above described.

With the two coupling parts connected in the above mentioned manner, as the pressure of the material passing through the bores 10', 11' in the coupling increases, the pressure acts on the sealing ring 17 or 17" through a gap 50 between the mating surfaces of the coupling parts to push the sealing ring toward the under surface of the annular plate 15 or the top wall of the member 41, simultaneously deforming the sealing ring in such a manner as to effect an increasingly tight seal between the Teflon coated surface 36 of the sealing ring and the surfaces it is pressed against. In this connection, the tapered mating end portion of the male coupling part is particularly effective. As the sealing ring is pressed upward, the outer diameter of the tapered portion of the male coupling part the sealing ring contacts increases so that the ring is pressed against the peripheral surface of the male coupling part the more tightly, with resulting increase in the sealing effect of the ring. The locking means securely protects against separation of the two coupling parts under high pressure or by accident, while permitting free rotation of each of the coupling parts relative to the other, with the completely high sealing effect being maintained.

While in use, the coupling may well receive external forces in various directions, which would cause one of the two coupling parts to be displaced or bent relative to the other. Such displacement or bending would cause too much pressing of a portion of the sealing ring while breaking the sealing contact at another portion of the ring, with resulting leakage of the fluid therefrom. In accordance with invention, however, since the mating end portion of the male coupling part is fitted into the corresponding recess 13 of the female coupling part, such displacement or bending can be completely prevented and a perfect sealing contact can always be maintained.

It may happen that the lock release sleeve 35 is accidentally and unwantedly moved by an object hitting thereon so as to cause separation of the two coupling parts while the coupling is in use. The brim 51 can advantageously prevent such accidental lock releasing movement of the sleeve 35. The two cut away portions 51' in the brim enables easier manipulation of the sleeve 35 when it is actually desired to separate the two coupling parts.

In the case the coupling is inserted in a vacuum line, as the vacuum increases, the sealing ring is sucked toward the upper surface of the flange 12, 12' of the male coupling part in the opposite manner to, and with substantially the same tight sealing effect as, previously mentioned. The radial groove 37 or concentric bore 38 in the sealing ring helps the deformation of the ring under pressure; and the Teflon coating 36 not only provides a smooth, slippery surface for quick putting-in or out of the male coupling part while ensuring a tight seal, but also protects the sealing ring against abrasion due to repeated connection and disconnection of the coupling parts, thereby ensuring a long life of the sealing ring. The core 39 in the sealing ring 17' protects the natural memory of the ring material against fatigue while permitting the necessary deformation thereof in normal use.

When the cover 25, 25' is simply removed, the locking means and the annular members 15, 41 can immediately be taken off for easy access to or removal of the sealing ring.

While certain embodiments of the invention have been described hereinbefore, they are merely illustrative and many other modifications and changes are possible. For example, the locking ring 18 employed in FIGS. 1a or 2 may take the place of the locking means in FIG. 3, and vice versa, with the necessary minor changes in the design of the associated parts which are obvious from the above description.

I claim:

1. A coupling device comprising: a female part having a through axial bore and provided adjacent the mating end thereof with a radially outwardly extending flange portion; a male part having a shank portion of a given outside diameter and a through axial bore, which is provided adjacent the mating end thereof with a second diameter portion of a diameter greater than said given diameter defining a circumferentially extending shoulder; a cover member being readily removably mounted adjacent a first end thereof on said flange, said cover member having adjacent a second end thereof a radially extending wall portion having a centrally disposed opening adapted to freely receive said second diameter portion of said male part, and said cover member cooperating with said flange portion to define a radially inwardly opening recess; a first means, said cover member and said flange portion having opposed radially extending surfaces adapted to removably position said first means within said recess, said first means cooperating with said flange portion and cover member to divide said recess into radially inwardly opening first and second cavities, respectively; a first annular sealing means disposed within said first cavity; a locking means disposed within said second cavity, said first means, said first annular sealing means and said locking means being removable from said recess through said first end of said cover member when removed from said flange portion, said locking means including a plurality of segments and resilient means encircling said segments whereby said segments form a radially outwardly expansible ring whose non-expanded inner diameter is less than the outer diameter of said second diameter portion of said male part, said ring having an inwardly disposed portion adapted to engage said shoulder to effect a locking connection between said male and female parts to normally maintain said parts in a coupled position and prevent withdrawal of said male part through said wall opening, each of said ring segments and said wall portion having axially extending means disposed in overlapping relation and cooperating to prevent removal of said ring through said wall opening upon withdrawal of said male part therethrough, said first cavity being bounded in part by an axially extending inwardly facing surface, said first annular sealing means being operably disposed in engagement with said axially extending inwardly facing surface and dimensioned to sealingly engage said second diameter portion of said male part when in coupled position; a second annular sealing means, said second annular sealing means being disposed on a radially extending surface of one of said flange portion and said first means and engaging the other; and lock release means, said release means including a sleeve slidably mounted on said shank portion of said male part for movement axially toward said shoulder, and said sleeve, when moved toward said shoulder, being adapted to engage said segments and expand said ring against the bias of said resilient means to release said locking connection.

2. A coupling device comprising: a female part having a through axial bore and provided adjacent the mating end thereof with a radially outwardly extending flange portion, said bore having a flared portion adjacent the mating end of said female part; a male part having a shank portion of given outside diameter and a through axial bore, which is provided adjacent the mating end thereof with a second diameter portion of a diameter greater than said given diameter defining a circumferentially extending shoulder, said second diameter portion having an outwardly facing surface tapered toward said mating end of said male part; a cover member being readily removably mounted adjacent a first end thereof on said flange, said cover member having adjacent a second end thereof a radially extending wall portion having a centrally disposed opening adapted to freely receive said second diameter portion of said male part, and said cover member cooperating with said flange portion to define a radially inwardly opening recess; a first means, said cover member and said flange portion having opposed radially extending surfaces adapted to removably position said first means within said recess, said first means cooperating with said flange portion and cover member to divide said recess into radially inwardly opening first and second cavities, respectively; an annular sealing means disposed within said first cavity; a locking means disposed within said second cavity, said first means, said annular sealing means and said locking means being removable from said recess through said first end of said cover member when removed from said flange portion, said locking means including a plurality of segments and resilient means encircling said segments whereby said segments form a radially outwardly expansible ring whose nonexpanded inner diameter is less than the outer diameter of said second diameter portion of said male part, said ring having an inwardly disposed portion adapted to engage said shoulder to effect a locking connection between said male and female parts to normally maintain said parts in a coupled position and prevent withdrawal of said male part through said wall opening, each of said ring segments and said wall portion having axially extending means disposed in overlapping relation and cooperating to prevent removal of said ring through said wall opening upon withdrawal of said male part therethrough, said first cavity being bounded in part by an axially extending inwardly facing surface, said annular sealing means being dimensioned to movably and sealingly engage said axially extending inwardly facing surface and said tapered surface of said second diameter portion of said male part when in coupled position, said tapered surface of said second diameter portion of said male part being received within said flared portion of the bore of said female part when said parts are in said coupled position; and lock release means, said release means including a sleeve slidably mounted on said shank portion of said male part for movement axially thereof from an inoperable position toward said shoulder, and one end of said sleeve, when said sleeve is moved toward said shoulder, being adapted to engage said segments and expand said ring against the bias of said resilient means to release said locking connection.

3. A coupling device according to claim 2, wherein a radially outwardly extending protective rim member is provided on said shank portion of said male part, said rim member having an outside diameter at least equal to the outside diameter of said sleeve, and said rim member being disposed on said shank portion at a point adjacent the other end of the said sleeve when said sleeve is in said inoperable position.

References Cited
UNITED STATES PATENTS

| | | | |
|---|---|---|---|
| 1,509,651 | 9/1924 | Iftiger | 285—315 |
| 1,587,079 | 6/1926 | Machino | 285—104 |
| 2,438,107 | 3/1948 | Babbitt | 285—122 |
| 2,579,972 | 12/1951 | Scheiwer | 73—37 |
| 2,702,200 | 2/1955 | Fukuyama | 285—97.3 |
| 2,901,269 | 8/1959 | Rickard | 285—39 |
| 2,906,552 | 9/1959 | White | 288—17 |
| 2,912,262 | 11/1959 | Franck | 285—231 |
| 3,075,792 | 1/1963 | Franck | 285—178 |
| 3,089,713 | 5/1963 | Scaramucci | 285—14 |

FOREIGN PATENTS

| | | |
|---|---|---|
| 957,704 | 2/1957 | Germany. |

CARL W. TOMLIN, *Primary Examiner.*

W. L. SHEDD, *Assistant Examiner.*